(12) United States Patent
Li et al.

(10) Patent No.: US 10,537,963 B2
(45) Date of Patent: Jan. 21, 2020

(54) COATED SUBSTRATE AND PROCESS FOR CUTTING A COATED SUBSTRATE

(71) Applicant: APPLE INC., Cupertino, CA (US)

(72) Inventors: Michael M. Li, Cupertino, CA (US); Anthony J. Richter, Cupertino, CA (US); Yulei Sun, Cupertino, CA (US); Raul A. Molina, Emeryville, CA (US)

(73) Assignee: APPLE INC., Cupertino, CA (US)

( * ) Notice: Subject to any disclaimer, the term of this patent is extended or adjusted under 35 U.S.C. 154(b) by 786 days.

(21) Appl. No.: 14/575,754

(22) Filed: Dec. 18, 2014

(65) Prior Publication Data

US 2015/0298251 A1 Oct. 22, 2015

Related U.S. Application Data

(60) Provisional application No. 61/981,637, filed on Apr. 18, 2014.

(51) Int. Cl.
*B23K 26/00* (2014.01)
(52) U.S. Cl.
CPC .................................. *B23K 26/009* (2013.01)
(58) Field of Classification Search
None
See application file for complete search history.

(56) References Cited

U.S. PATENT DOCUMENTS

| 5,178,725 A | * | 1/1993 | Takeno | B23K 15/08 |
| | | | | 216/101 |
| 2002/0072252 A1 | * | 6/2002 | Nakajima | C23C 16/56 |
| | | | | 438/795 |
| 2005/0156353 A1 | * | 7/2005 | Watts | B82Y 10/00 |
| | | | | 264/293 |
| 2013/0330506 A1 | * | 12/2013 | Schmidt | B26F 1/28 |
| | | | | 428/131 |

FOREIGN PATENT DOCUMENTS

| JP | S55151351 | | 11/1980 |
| JP | H04182093 | | 6/1992 |
| JP | 2005-150523 | * | 6/2005 |
| JP | 2005150523 | | 6/2005 |

(Continued)

OTHER PUBLICATIONS

YouTube Video (High quality laser cutting of sapphire with Lasag LFS150, published on Jun. 19, 2013, link: https://www.youtube.com/watch?v=sf3lasXzwDs ).*

(Continued)

*Primary Examiner* — Matthew J Daniels
*Assistant Examiner* — Mohammad M Ameen
(74) *Attorney, Agent, or Firm* — Dorsey & Whitney LLP

(57) ABSTRACT

A system and method of forming a sapphire component. The method may include disposing an absorptive-barrier layer on a first surface of a sapphire substrate, performing a cut in the sapphire substrate using a laser beam incident on the absorptive-barrier layer, and forming and removing molten sapphire from the cut. The method may also include shielding a region of the first surface that is adjacent to the cut from the molten sapphire using the absorptive-barrier layer, and removing the absorptive-barrier layer from the first surface of the sapphire substrate.

15 Claims, 8 Drawing Sheets

(56) References Cited

FOREIGN PATENT DOCUMENTS

| JP | 2005333122 | | 12/2005 |
|---|---|---|---|
| JP | 2006-192478 | * | 7/2006 |
| JP | 2006192478 | | 7/2006 |
| JP | 2013006200 A | | 1/2013 |

OTHER PUBLICATIONS

Ruttimann (Christoph Ruttimann: "Sapphire Cutting with Pulsed Fiber Lasers" Laser Technik Journal, Mar. 2014, p. 48-50 www.laser-journal.de).*

* cited by examiner

COATED SUBSTRATE AND PROCESS FOR CUTTING A COATED SUBSTRATE

CROSS-REFERENCE TO RELATED APPLICATION

This application claims the benefit under 35 U.S.C. § 119(e) of U.S. Provisional Patent Application No. 61/981,637, filed on Apr. 18, 2014, and entitled "Coated Substrate and Process for Cutting a Coated Substrate," which is incorporated by reference as if fully disclosed herein.

TECHNICAL FIELD

The subject matter of this disclosure relates generally to manufacturing a sapphire part, and in particular to forming a sapphire part using a laser to cut a sapphire substrate having an absorptive and/or barrier layer.

BACKGROUND

Corundum is a crystalline form of aluminum oxide and is found in various different colors, most of which are generally referred to as sapphire. Sapphire is a hard and strong material with a hardness of 9.0 on the Mohs scale, and, as such, is capable of scratching nearly all other minerals. Because of its hardness and strength, sapphire may be an attractive alternative to other translucent materials like glass or polycarbonate. Sapphire may also be produced in thin sheets and polished to achieve exceptional optical performance.

However, in some cases, it may be difficult to process thin, highly polished sheets of sapphire material using traditional techniques. For example, performing a fusion laser cut on a polished sapphire sheet may result in a spatter of molten sapphire deposited on the polished surface. Once cooled and hardened, the spatter may adhere to the polished surface and require further processing to remove. Additionally, in some cases it may be difficult to initiate a laser cut in a sapphire sheet having a highly polished face that does not readily absorb the laser energy.

SUMMARY

Embodiments described herein are directed to a sapphire component having a layer or multiple layers disposed on one or more surfaces of the sapphire component. The layer(s) may form a barrier and/or an absorptive layer that is configured to facilitate a laser cutting process. For example, the layer(s) may form a barrier that prevents or limits the adhesion of molten sapphire that may be a byproduct of a laser cutting operation or process. Additionally or alternatively, the layer(s) may also function as an absorptive layer that is configured to absorb light emitted from the laser and create a localized heating of the sapphire material, which may facilitate initiation of a laser cut through the sapphire component.

One example embodiment may include a method of forming a sapphire component, including disposing an absorptive-barrier layer on a first surface of a sapphire substrate. A cut may be performed in the sapphire substrate using a laser beam incident on the absorptive-barrier layer. As part of the laser cutting operation, molten sapphire may be formed and removed from the cut. The method may also include shielding a region of the first surface that is adjacent to the cut from the molten sapphire using the absorptive-barrier layer. In some embodiments, the absorptive-barrier layer is removed from the first surface of the sapphire substrate after the laser cutting operation is complete.

In some embodiments, the absorptive-barrier layer is applied directly to the first surface of the sapphire substrate. For example, the absorptive-barrier layer may be sprayed, printed, and/or painted on the first surface of the sapphire substrate. In some embodiments, the absorptive-barrier layer is formed separately and is adhered to the absorptive-barrier layer on the first surface of the sapphire substrate. In some embodiments, the absorptive-barrier layer is dispensed on the first surface of the sapphire substrate. An absorptive-barrier layer may be formed on one or both sides of a sapphire substrate sheet.

In some embodiments, the performing of the cut in the sapphire substrate includes performing a fusion laser cutting process. In some cases, during the fusion laser cutting process, the molten sapphire is removed from the cut using a stream of gas. In some implementations, the absorptive-barrier layer is configured to increase an absorption of the laser beam's radiation within the sapphire substrate to create a localized region of heat energy at the first surface of the sapphire substrate. The localized region of heat energy may facilitate a laser-cutting operation by helping to melt the sapphire material near the surface of the substrate. In some cases, the cut is initiated in the sapphire using the localized region of heat energy to form a region of molten sapphire.

In some embodiments, the disposing of the absorptive-barrier layer includes forming a barrier on the first surface of the sapphire substrate. The barrier may be configured to shield to the first surface from the molten sapphire. The molten sapphire may be transported or sprayed on the surface of the absorptive-barrier layer as a result of a fusion laser cutting process or operation. In some cases, the molten material may be deposited as droplets on the surface of the absorptive-barrier layer and cool and harden.

In some embodiments, absorptive-barrier layer is formed from a material having a melting temperature lower than a melting temperature of the sapphire substrate. In some cases, the melting temperature of the material forming the absorptive-barrier layer is equal to or greater than 200 degrees Celsius. In some embodiments, the absorptive-barrier layer is formed from a polymer material. In some embodiments, the absorptive-barrier layer includes a material selected from a polyester sheet, a plastic film, a coating formed by a physical vapor deposition (PVD) process, an ink printing material, and a painted material. In some cases, the absorptive-barrier layer includes an opaque material having a diffuse surface finish.

In some example embodiments, the sapphire substrate is irradiated using a laser beam incident on an absorptive-barrier layer that is disposed relative to a first surface of the sapphire substrate. In some cases a cut is initiated in the sapphire substrate by forming a localized region of heat energy using the absorptive-barrier layer. The sapphire substrate may be cut through using the laser after the cut has been initiated.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
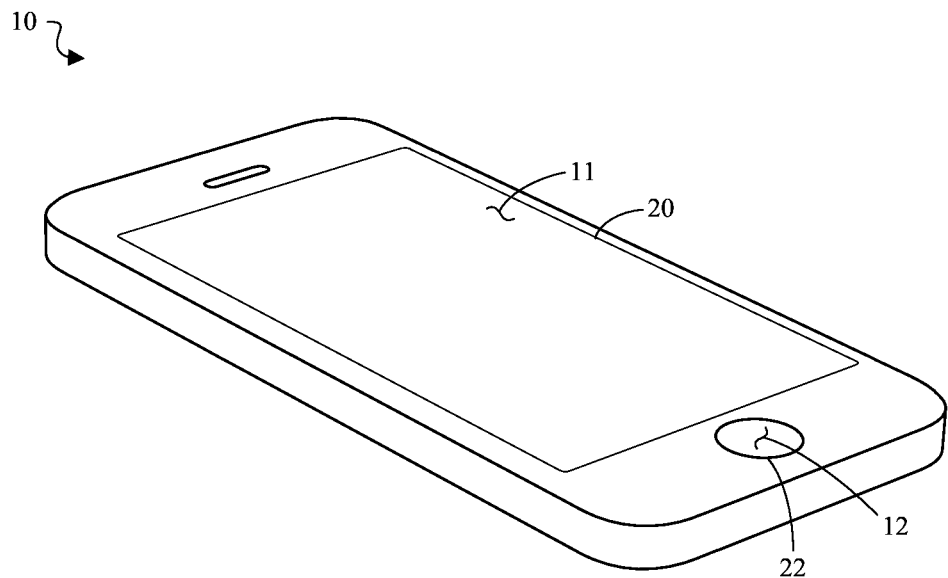
FIG. 1A depicts a front view of an example electronic device.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In general, there may be advantages for a consumer or non-consumer device to include protective coverings, windows, and/or surfaces formed from hard materials such as sapphire. Compared to other optically clear materials like traditional silicate glass, sapphire offers improved scratch resistance and strength. However, thin sheets of optically clear sapphire may be difficult to manufacture using some traditional techniques. In particular, it may be difficult to initiate a laser cut on a sheet that is both very thin and highly polished. Additionally, laser cutting a polished sheet may affect the surface finish of a polished surface, which may require further lapping and/or polishing to restore. As discussed herein, in accordance with various embodiments, sapphire components can be manufactured by laser cutting a sapphire substrate having an absorptive-barrier layer that may reduce or eliminate some issues related to manufacturing thin sapphire components.

In some embodiments, a sapphire substrate may have an absorptive-barrier layer formed on a surface that facilitates a laser-based manufacturing processes. In particular, the absorptive-barrier layer may facilitate a laser fusion cutting operation. In some instances, during a fusion cutting operation, a laser beam is used to heat and partially melt a portion of the sapphire substrate. A directed stream of gas may be used to remove molten sapphire leaving a void or depression in the sapphire substrate. The efficiency and edge finish produced by a fusion cut may be superior to other types of laser cutting techniques, including, for example, physical etching, ablation laser cutting, or laser scribing.

However, in some circumstances it may be difficult to use a fusion cutting process on a thin, highly polished sapphire sheet. In particular, during a fusion cutting operation, the molten sapphire that is removed by the gas stream may form a flume of spatter on the surface of the sapphire substrate. When the molten sapphire cools and hardens, it may adhere to the surface and become difficult to remove. If the sapphire substrate has already been polished, further lapping or surface polishing may need to be performed to remove the spatter produced by the fusion cut. As described in some embodiments below, an absorptive-barrier layer disposed on a sapphire substrate may shield or protect the surface of the substrate from molten sapphire that may be created during a fusion cut. In some cases, the absorptive-barrier layer is configured to have a melting point that is sufficiently high to form an effective barrier to the molten sapphire. Additionally, the melting point and thermal properties of the absorptive-barrier layer may be configured to minimize or prevent the material from receding away from the laser cut thereby exposing a portion of the sapphire surface adjacent to the cut.

Additionally, in some cases, it may be difficult to initiate a fusion cut on a sapphire substrate that has been polished to a fine surface finish (e.g., polished surface). For example, a sapphire substrate having a fine surface finish may be too transparent to sufficiently diffuse or in-couple the laser light and generate the heat required to initiate a laser cut. As described in some embodiments below, an absorptive-barrier layer disposed on a sapphire substrate may facilitate a laser cutting operation by increasing the absorption of the laser beam near the surface of the substrate. In some cases, the absorptive-barrier layer facilitates the formation of a localized region of heat energy at the first surface of the sapphire substrate and helps to initiate a laser cut in the sapphire material. In some cases, the initiated cut may be used to advance a laser cut through or partly through the sapphire material. In some cases, once the laser cut has been initiated using the absorptive-barrier layer, the laser cut may be advanced to regions of the sapphire substrate that are not covered by the absorptive-barrier layer, The systems and techniques described herein can be used to facilitate a laser cutting operation to manufacture a sapphire component or part. While the following examples are provided with respect to a laser fusion cutting operation, the systems and techniques may also be applicable to other types of laser-based operations including, for example, laser ablation, laser etching, laser stress cracking, and the like. Additionally, although the embodiments and processes discussed herein relate to a sapphire substrate, it is understood that additional materials having similar characteristics (e.g., high melting temperature, high hardness, optically transparent, etc.) as sapphire may be undergo similar processes. In accordance with various embodiments described below, a sapphire substrate having an absorptive-barrier layer may be used to produce a thin sheet sapphire component having an exceptional surface finish.

Figure 1B:
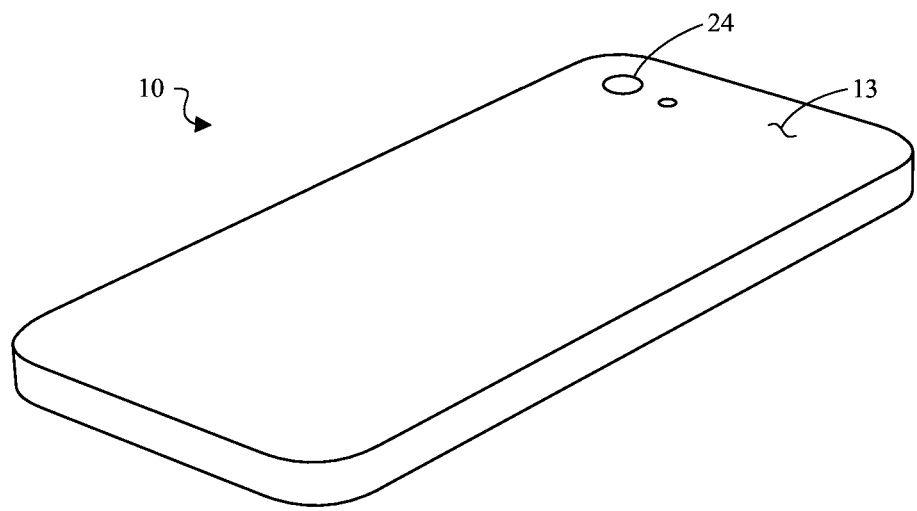
FIG. 1B depicts a rear view of an example electronic device.

In accordance with various embodiments, FIGS. 1A-B depict a device having multiple hard protective sheets on the exterior of the device. In the present example, the protective sheets are formed from one or more sapphire components, which may provide outstanding scratch resistance and enhance the mechanical integrity of the device. A protective sheet may also function as an optically transmissive window and provide visibility to underlying components, such as display screens or graphical elements. In a typical implementation, both the optical and mechanical properties of the protective sheets may be important to perception of quality and performance of the device.

As shown in FIG. 1A, the device 10 includes protective cover sheet 11 formed from a sapphire component and used as an optically transmissive protective layer. The cover sheet 11 is typically attached to the device 10 using an optically transmissive adhesive or other bonding technique. In this example, the cover sheet 11 is attached using a pressure sensitive adhesive (PSA) film. The cover sheet 11 may be attached to the face of the display screen 20 and protect the display screen 20 from scratches or other physical damage. The display screen 20 may include a liquid crystal display (LCD), organic light emitting diode (OLED) display, or similar display element. Because the cover sheet 11 overlays the display screen 20, optical clarity, a polished surface finish, material thickness, and physical strength may be useful aspects of the cover sheet's 11 functionality, alone or in conjunction with other such aspects. The cover sheet 11 may also be attached to, or be integrated with, a transparent electronic sensor that overlays the display screen 20. In some cases, the electronic sensor covers the entire display screen 20 and is used as the main input device for the user. In some implementations, the cover sheet 11 may be integrated with a touch sensor configured to detect finger or stylus touches on the surface of the cover sheet 11, a force sensor configured to determine a force exerted on the cover sheet 11, or other sensors that detect interactions with the cover sheet 11.

In some embodiments, the cover sheet 11, depicted in FIG. 1A, is formed from a sapphire component having an overall thickness equal to or less than 3 mm. In some embodiments, the sapphire component may have a thickness that is greater than 3 mm. Typically, the overall thickness of the cover sheet 11 is less than 1 mm, although this thickness may vary between devices and/or embodiments. In some cases, the overall thickness is less than 0.3 mm. In one non-limiting example, the overall thickness of the sapphire component is approximately 0.25 mm, and may be less. For very thin sheets of sapphire material (e.g., approximately 0.5 mm or less), the addition of an absorptive-barrier layer in accordance with the some embodiments may improve laser cutting and manufacturing processes.

The cover sheet 11 may be formed from a sapphire material that includes alumina, corundum, or other forms of aluminum oxide ($Al_2O_3$). Accordingly, references to sapphire or a sapphire material may incorporate or encompass one or more forms aluminum oxide. In some embodiments, the cover sheet 11 may be formed from a single sheet of sapphire material or, alternatively, be formed from a laminate material made from multiple layers and having at least one layer formed from a sheet of sapphire. In the present example, one side of the cover sheet 11 is printed with a solid, opaque border around a perimeter portion. The center portion of the cover sheet 11 remains optically transmissive. The printed side of the cover sheet 11 is typically the side that is opposite the external face of the device 10 to prevent the printed portion from becoming scratched or damaged. The side of the cover sheet 11 that is external to the device may include an anti-reflective or other type of coating to enhance the optical properties of the cover sheet 11.

As shown in FIG. 1A, the front surface of the device 10 also includes a button sheet 12 used to protect the surface of the control button 22. In this example, the button sheet 12 is formed from a sapphire component and is used as an optically transmissive protective layer. The button sheet 12 protects the surface of a control button 22 and allows visibility of any graphical elements that are printed on the control button 22. In some cases, it is not necessary that the button sheet 12 be optically transmissive. For example, the button sheet 12 may be opaque and itself printed with a graphical element or symbol. In this case, the button sheet 12 is a flat sheet, but in other embodiments, the button sheet 12 may be formed as a contoured or curved surface.

The button sheet 12 may enhance the mechanical strength of control button 22, which is used as an input to the device 10. In the present example, the control button 22 includes a tactile switch which is operated by depressing the control button 22. The control button 22 may also include or be associated with an electronic touch sensor, such as a capacitive touch sensor or biometric sensor. The button sheet 12 may be attached directly to a housing of the control button 22 and may, alternatively be attached or integrated with the electronic touch sensor of the control button 22. Similarly, a sapphire component can be used as a protective cover for a variety of input mechanisms, including, a slide, wheel, key, and the like.

In some embodiments, the button sheet 12 depicted in FIG. 1A is formed from a sapphire component having an overall thickness equal to or less than 3 mm. In some embodiments, the sapphire component may have a thickness that is greater than 3 mm. Typically, the thickness of the sapphire component is less than 1 mm. In some cases, the overall thickness of the sapphire component is less than 0.3 mm. In one non-limiting example, the overall thickness is approximately 0.25 mm, and may be less. Similar to the cover sheet 11, the button sheet 12 may be formed from a single sheet of sapphire material or, alternatively, be formed from a laminate material having at least one layer formed from a sheet of sapphire. In some cases, the button sheet 12 is formed from the same material as the cover sheet 11, although this is not necessary. One or both sides of the button sheet 12 may also be printed or coated to enhance the optical properties of the sapphire part.

As shown in FIG. 1B, the back surface of the device 10 is protected by a back sheet 13. Similar to the cover sheet 11, the back sheet 13 is also formed from a sapphire component and is used as an optically transmissive protective layer. In this case, the back sheet 13 provides visibility of graphical elements printed on the back face of the device 10. Also similar to the cover sheet 11, the back sheet 13 may be formed from a single sheet of sapphire material or, alternatively, be formed from a laminate material having at least one layer formed from a sheet of sapphire. In this case, the back sheet 13 covers the entire back of the device 10, except for the area near the camera lens 24. A separate sapphire component may be used to protect the camera lens 24. In an alternative embodiment, the back sheet 13 also covers the camera lens 24 and a separate sapphire component is not used.

In this example, the protective cover sheets (11, 12, 13) are formed from sapphire sheet components made from a crystalline form of alumina (Al2O3), also referred to as corundum. FIGS. 1A-B are provided by way of example, and a sapphire component may be used to form a protective cover over virtually any exterior surface. The sapphire sheet may range in thickness from 3 mm to 0.1 mm and may have a hardness of approximately 9.0 on the Mohs scale, although alternative embodiments may have sheet(s) of different thickness(es). As discussed above, any one of the protective cover sheets (11, 12, 13) may be formed as a laminate of multiple sheets of material and may also be coated with one or more materials to enhance the optical or mechanical properties of the part. In some cases, it may be beneficial to form all of the protective cover sheets (11, 12, 13) from the same sapphire substrate to simplify the manufacturing process. However, different types of sapphire substrates may be used for each cover sheet, depending on the optical and/or mechanical properties desired for each piece.

As shown in FIGS. 1A-B, the device 10 is a portable electronic device. The device 10 may be any one of a variety of devices utilizing a hard substrate as a covering, window, and/or surface. For example, the device 10 may be a portable electronic device, such as a mobile phone, portable media player, wearable electronic device, health monitoring device, and/or other portable appliance. Similar types of protective covers may be applied to other electronic devices, including, for example, tablet computers, notebook computers, and various wearable devices. Additionally, the protective covers may be applied to other types of devices including non-electronic devices, such as mechanical watches which utilize an optically transmissive face over the dial. Alternatively, the protective covers may be integrated with any device that includes a hard exterior surface, particularly if the surface includes a display screen, camera, or other optical element.

Figure 2:
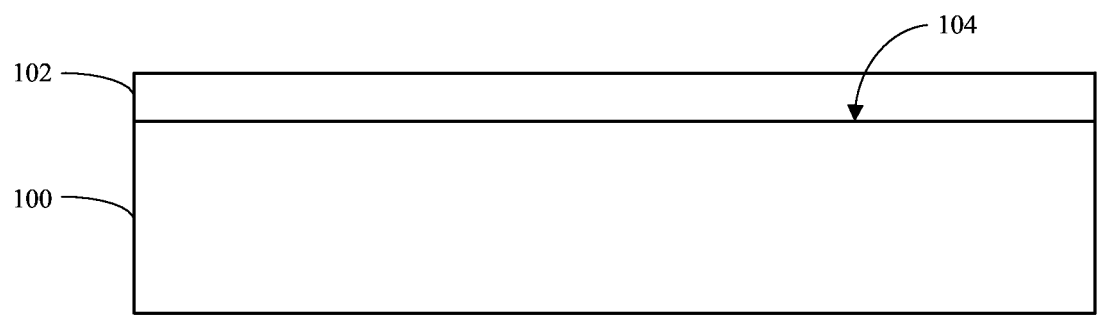
FIG. 2 depicts a cross-sectional view of a sapphire substrate and an absorptive-barrier layer, according to embodiments.

As discussed above with respect to FIGS. 1A-B, various components (e.g., cover sheet 11, button sheet 12, and back sheet 13) of an electronic device may be formed from sapphire material, which may include various forms of aluminum oxide. As shown in FIG. 2 and discussed in detail below, various components of electronic device 10 may be formed from a sapphire substrate 100. That is, and as discussed herein with respect to FIGS. 2, 3, and 4A-F, sapphire substrate may undergo a plurality of processes (e.g., laser cutting) in order to form one or more sapphire components used as a protective sheet for electronic device 10. Additionally, as discussed herein, to improve processing of sapphire substrate 100 and ultimately improve the sapphire component formed form sapphire substrate 100, an absorptive-barrier layer 102 may be disposed on a first surface 104 of sapphire substrate 100 prior to processing.

As shown in FIG. 2, and discussed herein, sapphire substrate 100 may include artificially grown corundum used to form a sapphire component for electronic device 10. One or more surfaces of sapphire substrate 100 may be subjected to one or more surface treatments, such as grinding, lapping, and polishing to achieve a fine surface finish on the surface 104. Additionally, the sapphire substrate 100, as shown in FIG. 2, may undergo pre-processing procedures prior to the addition of the absorptive-barrier layer 102, and the subsequent processes (e.g., laser cutting). In a non-limiting example, sapphire substrate 100 may be sliced from a boule, ground down to a desired thickness, and/or polished to provide the desired surface finish. In some cases, the sapphire substrate 100 has been processed to achieve a final surface finish.

As shown in FIG. 2, an absorptive-barrier layer 102 is disposed on first surface 104 of sapphire substrate 100. In one example, the absorptive-barrier layer 102 may be formed from a polymer material to substantially shield first surface 104 of sapphire substrate 100 during processing of sapphire substrate 100. In some cases, the absorptive-barrier layer 102, as shown in FIG. 2, may be formed from a polyester sheet, plastic film, paint (e.g., ink), curable opaque material (polymer spray), or other suitable material that may substantially form a protective barrier and/or an optically absorptive layer on first surface 104 of sapphire substrate 100. In some cases, the absorptive-barrier layer 102 is produced using a lamination process, a physical vapor deposition (PVD) process, printing process, painting process, or other technique for forming the absorptive-barrier layer 102 on the sapphire substrate 100.

In some cases, the absorptive-barrier layer 102 may have a melting temperature that is lower than a melting temperature of sapphire substrate 100. In a non-limiting example, the material forming the absorptive-barrier layer 102 may include a melting temperature of approximately 200° C., and the melting temperature of the sapphire substrate 100 may be approximately 2000° C. In some cases, the absorptive-barrier layer 102 has a melting temperature greater than or equal to 200° C. and less than or equal to the melting temperature of the sapphire substrate 100.

The material used to form absorptive-barrier layer 102 may also be tailored to facilitate a laser-based operation performed on sapphire substrate 100. In a non-limiting example, and as discussed herein, the material forming the absorptive-barrier layer 102 may have particular optical characteristics that facilitate or improve a laser cutting process performed on sapphire substrate 100. In one example, absorptive-barrier layer 102 may be substantially opaque with a diffuse surface finish. In particular, the absorptive-barrier layer 102 may be substantially opaque to the wavelength of light produced by a cutting laser. Generally, the transparency characteristic (e.g., opacity) of the absorptive-barrier layer 102 may be tailored to the operational characteristics or perimeters (e.g., wavelength, power, pulse length, spot size) of the laser beam used to cut the sapphire substrate 100. In some cases, the surface finish of the absorptive-barrier layer 102 may also be tailored to facilitate laser absorption. That is, absorptive-barrier layer 102 may include a substantially rough or abrasive surface finish to aid in laser absorption for processing and/or cutting sapphire substrate 100, as discussed herein with respect to FIGS. 4A-F.

As discussed herein, an absorptive-barrier layer 102 having particular optical qualities may be disposed on sapphire substrate 100 and facilitate absorption of a laser beam to initiate a laser cut in the sapphire substrate 100. In particular, the absorptive-barrier layer 102 may absorb laser radiation and form a localized region of heat energy near the surface of the sapphire substrate and facilitate melting or vaporization of the sapphire in that region. For very thin sheets of sapphire material (e.g., approximately 0.5 mm or less), the addition of an absorptive-barrier layer having suitable optical properties may substantially improve the laser cutting process. In one non-limiting example, the overall thickness of the sapphire component may be approximately 0.25 mm. In another non-limiting example, the overall thickness of the sapphire component may be less than 0.25 mm.

Figure 3:
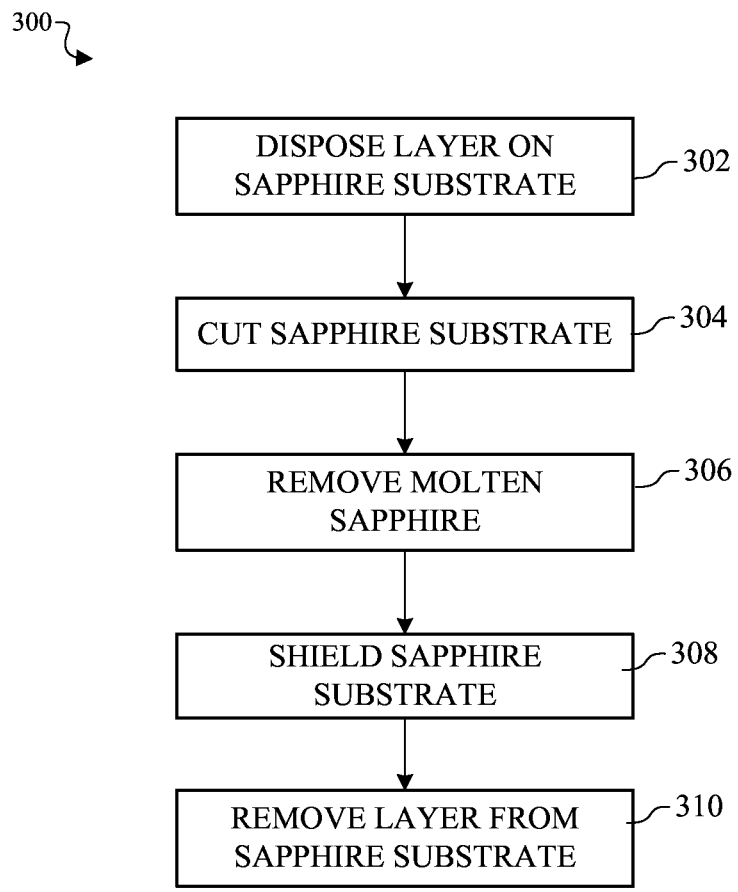
FIG. 3 depicts a flow chart of an example process for forming a sapphire component.

FIG. 3 depicts an example process for forming a sapphire component using an absorptive-barrier layer and a laser-based cutting operation. Specifically, FIG. 3 is a flowchart depicting one example process 300 for forming a sapphire component. In some cases, the sapphire component may be used to form one or more protective sheets in an electronic device, as discussed above with respect to FIGS. 1A-B.

In operation 302, one or more absorptive-barrier layers are disposed on a sapphire substrate. In one example, at least one absorptive-barrier layer is disposed on a first (optical) surface of the sapphire substrate. The method of disposing the absorptive-barrier layer on the first surface of the sapphire substrate may be dependent, at least in part, on the material used in the absorptive-barrier layer. In non-limiting examples, the disposing of the absorptive-barrier layer may include, applying, spraying, printing, painting, adhering and/or dispensing the absorptive-barrier layer on the first surface of the sapphire substrate. In the non-limiting example where the absorptive-barrier layer is adhered to the sapphire substrate, an adhesive layer may be applied to the first surface of the sapphire substrate to adhere the absorptive-barrier layer to the sapphire substrate. The disposing of the absorptive-barrier layer, in operation 302, may also include forming an opaque or light-absorptive material on or within the absorptive-barrier layer. The opaque or light-absorptive material formed on or within the disposed absorptive-barrier layer may facilitate a laser-based cutting operation. In some cases, the absorptive-barrier layer is formed from a material that has the desired opacity or light-absorptive properties without the addition of another material. As discussed in more detail below, the absorptive-barrier layer may shield or protect the first surface of the sapphire substrate during subsequent processing of the sapphire substrate.

In some implementations of operation 302, a plurality of absorptive-barrier layers may be disposed relative to the sapphire substrate. More specifically, an absorptive-barrier layer may be disposed on a first surface of the sapphire substrate, and another absorptive-barrier layer may be disposed on a second surface of the sapphire substrate, opposite the absorptive-barrier layer disposed on the first surface. Additionally, multiple absorptive-barrier layers may be disposed relative to each other and both layers disposed on a surface of the sapphire substrate.

With respect to example process 300, in some implementations, the sapphire substrate is provided already having the absorptive-barrier layer already formed on one or more surfaces. That is, in some implementations, operation 302 may be optional due to the manner in which the material is provided or handled by upstream manufacturing processes. For example, in some cases, the absorptive-barrier layer may be formed on the surface of the sapphire substrate shortly after a final polishing process to reduce the chance of scratching or damage due to handling or manipulation of the sapphire substrate. In some cases, the absorptive-barrier layer may protect one or more surfaces of the sapphire substrate before and after the laser-cutting operation 304.

In operation 304, a cut may be performed on the sapphire substrate. The cut may be performed using a laser beam incident on the absorptive-barrier layer. In one example, a fusion laser cutting process may be performed on the sapphire substrate to cut the sapphire substrate to form sapphire components for an electronic device. In some cases, during the cutting process of operation 304, the absorptive-barrier layer may absorb energy from the incident laser beam and form a localized region of heat energy. As previously mentioned, a localized concentration of energy may aid in initiating a cut in the sapphire substrate. Once the cut is initiated, the laser may advance the cut through the material and/or along a cutting path to form a profile cut. In some implementations, the absorptive-barrier layer is only utilized during the initiation of the cut, and the laser may advance the cut to a region of the sapphire substrate that is not coated or covered by the absorptive-barrier layer. In some embodiments, the cut does not advance all the way through the sapphire substrate and may form a groove, channel, or other type of recess in the surface of the sapphire substrate.

In operation 306, an amount of molten sapphire may be formed and removed from the cut in the sapphire substrate. In one example, a fusion cutting process is performed in operation 304. As part of the fusion cutting process, an amount of molten sapphire may be formed within the cut of the sapphire substrate. The molten sapphire may then be removed from the cut of the sapphire substrate using a jet or stream of gas that is directed to the portion of the substrate being cut. In some cases, a jet or stream of gas may propel or blow out the molten sapphire in order to create a void or cut in the sapphire substrate.

In some instances, removal of the molten sapphire from the cut using a jet or stream of air may propel the molten sapphire into a plume of small droplets. In some cases, the droplets of molten sapphire land back on the substrate in a region near the cutting laser. As discussed previously, if the molten sapphire is deposited on a polished surface of the sapphire substrate, further processing may be required to remove the droplets and restore the sapphire substrate to an appropriate level of surface finish. As discussed below with respect to operation 308, use of an absorptive-barrier layer disposed on a surface of the sapphire substrate may prevent this undesirable result.

In operation 308, a region of the first surface of the sapphire substrate may be shielded or protected from the molten sapphire formed and removed from the cut in operation 306. In one example, the absorptive-barrier layer disposed on the first surface of the sapphire substrate may form a barrier and/or may shield a region of the first surface of the sapphire substrate positioned adjacent to the cut from molten sapphire removed from the cut using the stream of gas. In some cases, all or nearly all of the molten sapphire removed from the cut and projected upward by the gas stream may not be deposited on the first surface of the sapphire substrate due to the shielding provided by the absorptive-barrier layer. Additionally, the molten sapphire removed from the cut of the sapphire substrate may, instead, be deposited on the absorptive-barrier layer until further processing of the absorptive-barrier layer and/or sapphire substrate.

In some cases, the absorptive-barrier layer is formed from a material having a melting point and thermal properties that aid or enable the processes performed in operation 308. In particular, the melting point and thermal properties of the absorptive-barrier layer may help the absorptive-barrier layer maintain coverage of the first surface of the sapphire substrate. In some cases, the absorptive-barrier layer resists melting when proximate to the cutting laser beam. For example, the absorptive-barrier layer may have a melting point and/or thermal properties help to prevents or reduces the chance that the absorptive-barrier layer will recede away from the region adjacent to the laser cut.

In operation 310, the absorptive-barrier layer may be removed from the first surface of the sapphire substrate. More specifically, the absorptive-barrier layer, and any previously molten sapphire droplets deposited on the absorptive-barrier layer may be removed from the first surface of the sapphire substrate. Similar to methods of disposing of the absorptive-barrier layer in operation 302, the removal process may be dependent, at least in part, on the material used in the absorptive-barrier layer. In non-limiting examples, the absorptive-barrier layer may be removed by polishing, buffing, grinding, dissolving and/or washing the absorptive-barrier layer, including the molten sapphire, from the first surface of the sapphire substrate. In some cases, an ultrasonic cleaning process is used to remove the absorptive-barrier layer. The removal of the absorptive-barrier layer, including any sapphire droplets, from the sapphire substrate may result in the formation of a final sapphire component that may be substantially free from cosmetic, structural and/or optical defects caused by molten sapphire formed on the first surface of the sapphire substrate. As discussed above with respect to FIGS. 1A-B, the sapphire component may be used to form one or more of the protective sheets of an electronic device.

Turning to FIGS. 4A-4F, sapphire substrate 100 and absorptive-barrier layer 102 are shown undergoing various operations that may be performed in accordance with process 300 of FIG. 3. It is understood that similarly numbered components may function in a substantially similar fashion. Redundant explanation of these components has been omitted for clarity.

Figure 4A:
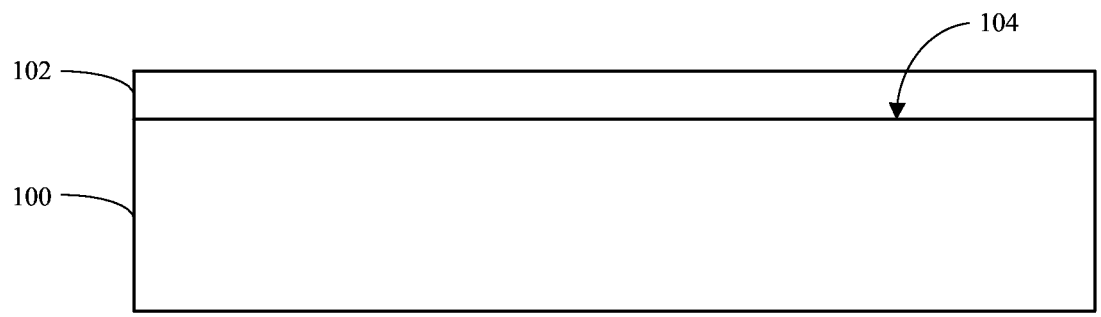
FIGS. 4A-4F depict cross-sectional views of a sapphire substrate and an absorptive-barrier layer undergoing processes of forming a sapphire component for an electronic device as depicted in FIGS. 1A-B.

As shown in FIG. 4A, absorptive-barrier layer 102 may be disposed on first surface 104 of sapphire substrate 100, as discussed herein. In some cases, the absorptive-barrier layer 102 may include an opaque, polymer material that may be applied directly to and/or positioned on first surface 104 of sapphire substrate 100. Additionally as discussed herein, the polymer material forming absorptive-barrier layer 102 may include a melt temperature (e.g., 200° C.) that may be less than the melting temperature (e.g., 2000° C.) of sapphire substrate 100. The disposing of the absorptive-barrier layer 102, as shown in FIG. 4A, may correspond to operation 302 of FIG. 3.

Figure 4B:
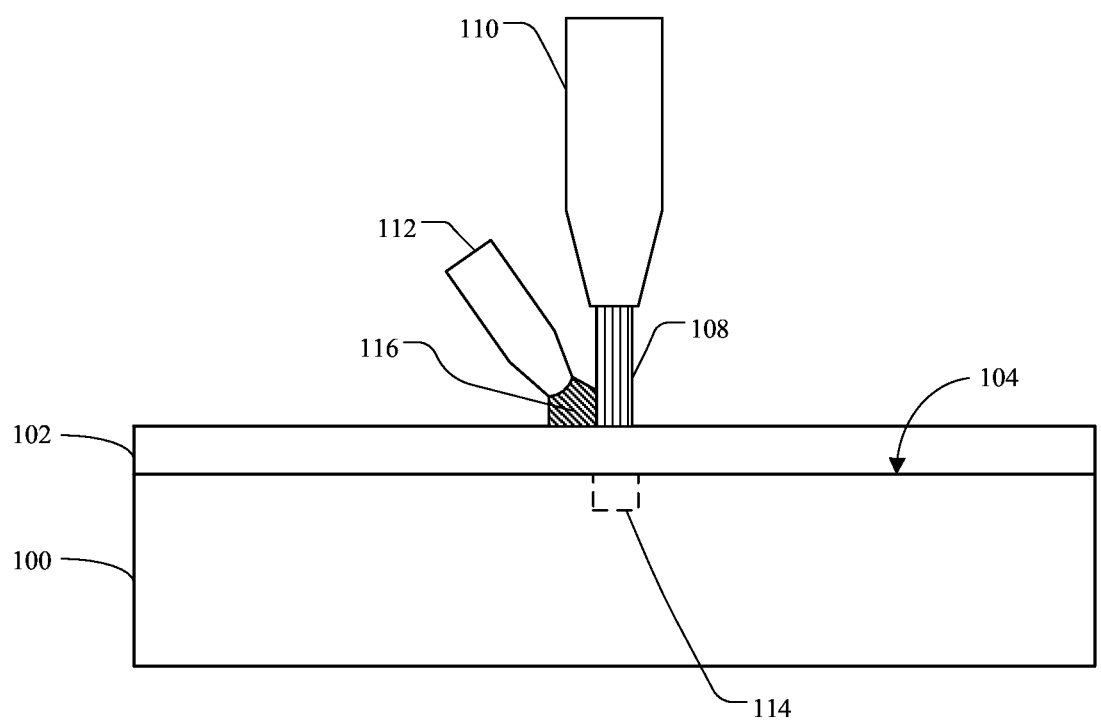
Figure 4C:
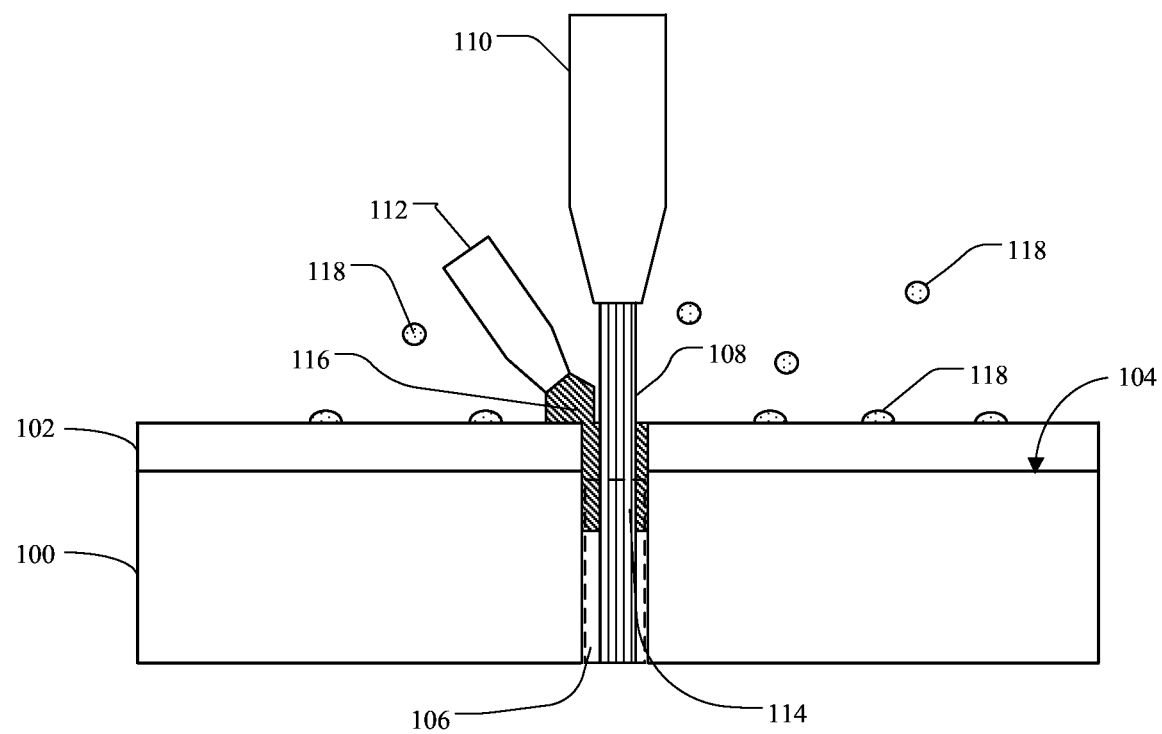

Turning to FIGS. 4B and 4C, a cut 106 (see, FIG. 4C) may be performed in the sapphire substrate 100, as discussed herein. Specifically, FIGS. 4B and 4C show the progression of performing cut 106 in the sapphire substrate 100 using a laser beam 108. The performing of the cut 106 in sapphire substrate 100, as shown in FIGS. 4B and 4C, may correspond to operation 304 of FIG. 3. In a non-limiting example, as shown in FIG. 4B, a laser 110 may be utilized to perform a fusion laser cutting process for performing the cut 106 within sapphire substrate 100. Laser 110 may include one of a variety of lasers that are suitable for providing a laser beam 108 capable of forming cut 106 in sapphire substrate 100, as discussed herein. In some embodiments, the laser cut is performed using a fiber laser that configured to produce a laser beam at wavelengths centered at approximately 1070 nm and pulse durations ranging from 0.2 to 10 ms. In some cases, the laser is configured to produce a laser beam at a power ranging from 10 watts to 150 watts average power (with a maximum of 1,500 watts of maximum power). Additionally as shown, and discussed below in detail, fusion laser system including fusion laser 110 may also include a gas delivery nozzle 112 positioned adjacent fusion laser 110. Gas delivery nozzle 112 may provide a jet or stream of gas 116 for removing portions of sapphire substrate 100 from cut 106 during operation of fusion laser 110, as discussed herein.

Fusion laser 110 may provide a laser beam 108 incident on and/or through absorptive-barrier layer 102, as discussed herein. Due in part to the optical characteristics, material composition, and/or lower melting temperature of the absorptive-barrier layer 102, the absorptive-barrier layer 102 may be configured to increase an absorption of radiation produced by the laser beam 108. The increased absorption may create a localized region or concentration of heat energy 114 at first surface 104 of sapphire substrate 100, which may facilitate an initial cut in the sapphire substrate 100. In a non-limiting example, as shown in FIGS. 4B and 4C, and discussed herein, sapphire substrate 100 may be formed from a polished sapphire sheet. As a result of the polished properties of sapphire substrate 100, photons of laser beam 108 may substantially pass through a region of bare sapphire substrate 100 without sufficiently heating and melting the sapphire substrate 100. However, as previously discussed, this may be avoided by using an absorptive-barrier layer 102 disposed or positioned on first surface 104.

Due, in part, to the opaque optical properties and/or the low melting temperature of the polymer material forming absorptive-barrier layer 102, absorption of radiation produced by the laser beam 108 may be increased by using an absorptive-barrier layer 102. Subsequently, in some cases, the absorptive-barrier layer 102 may ultimately transfer the radiation of laser beam 108 to create a localized region of heat energy 114 at first surface 104, and ultimately through sapphire substrate 100 (see, FIG. 4C). As shown in FIG. 4C, this localized region of heat energy 114 may initiate the cut in sapphire substrate 100.

As shown in FIG. 4C, the performing of the cut 106 using laser 110 may also result in the formation of droplets of molten sapphire 118 from the cut 106. More specifically, while forming the cut 106 in sapphire substrate 100, droplets of molten sapphire 118 may be formed from remnants of sapphire substrate 100 that are melted and/or removed from the cut 106. In some cases, the gas delivery nozzle 112 may provide a stream of gas 116 to the region near the cut 106 to remove or push molten sapphire 118 out of the cut 106. An amount of molten sapphire 118 may be propelled by the stream of gas 116 out of the cut 106 and away from sapphire substrate 100. In some cases, some amount of molten sapphire 118 that is removed from cut 106 is deposited on the absorptive-barrier layer 102. The forming and removing of molten sapphire 118, as shown in FIG. 4C, may correspond to operation 306 in FIG. 3.

Figure 4D:
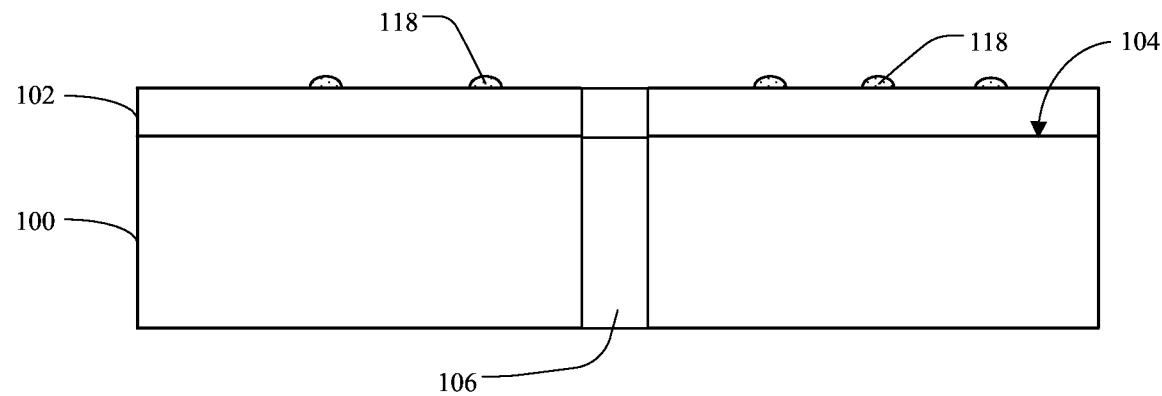

As shown in FIG. 4D, cut 106 may be completely formed in sapphire substrate 100 and the sapphire substrate 100 may be removed from fusion laser 110. As discussed herein with respect to FIG. 4C, previously molten sapphire 118 that was deposited on the absorptive-barrier layer 102 may remain as hardened sapphire droplets on absorptive-barrier layer 102. As discussed herein, absorptive-barrier layer 102 may form a barrier on first surface 104 of sapphire substrate 100 to shield first surface 104 from molten sapphire 118. More specifically, absorptive-barrier layer 102 may shield a region of first surface 104 positioned adjacent cut 106 from molten sapphire 118, such that molten sapphire 118 may not contact, and/or adhere to first surface 104 during and/or after forming the cut 106 in sapphire substrate 100. The shielding of the first surface 104 of the sapphire substrate 100, as shown in FIG. 4D, may correspond to operation 308 in FIG. 3.

Figure 4E:
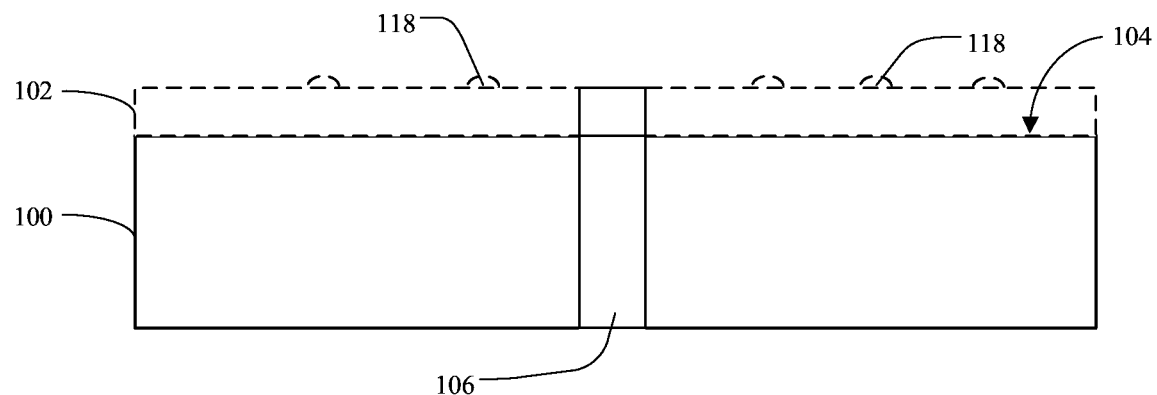
Figure 4F:
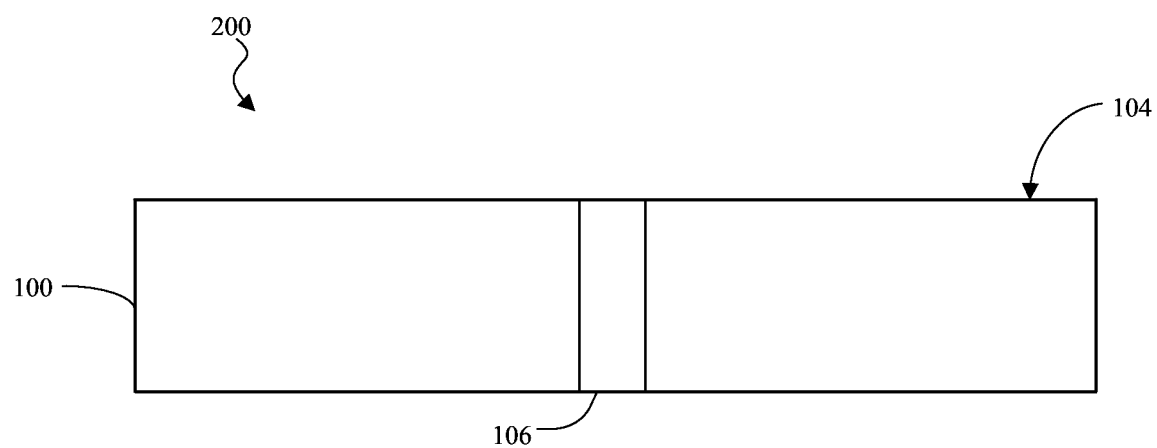

Finally, as shown in FIGS. 4E and 4F, absorptive-barrier layer 102 may be removed from first surface 104 of sapphire substrate 100. In one example, as shown in FIG. 4E, absorptive-barrier layer 102 and (previously) molten sapphire 118 (shown in phantom) may be removed from first surface 104 of sapphire substrate 100, such that molten sapphire 118 never contacts and/or bonds to first surface 104. Continuing the non-limiting example above, the opaque, polymer material forming absorptive-barrier layer 102, and the molten sapphire 118 contacting or bonded to absorptive-barrier layer 102, may be removed by using a polishing or ultrasonic cleaning technique. The removing of absorptive-barrier layer 102 and molten sapphire 118 formed on absorptive-barrier layer 102, as shown in FIGS. 4E and 4F, may correspond to operation 310 in FIG. 3.

As shown in FIG. 4F, a sapphire component 200 may be formed from sapphire substrate 100, and may be included in a component of electronic device 10. In one example, as shown in FIG. 4F, where sapphire substrate 100 includes a large sapphire sheet, a plurality of sapphire components 200 may be formed using the process and/or operations discussed herein with respect to FIGS. 3 and 4A-F. As previously mentioned, the sapphire component 200 may be used to form one or more protective sheets (e.g., cover sheet 11, button sheet 12, and back sheet 13) in an electronic device 10 (see, FIGS. 1A-B).

As previously mentioned, the absorptive-barrier 102 may serve as both a shielding protective layer and an optically absorptive layer. However, in some alternative embodiments, the absorptive-barrier layer 102 may only perform one of these two functions. For example, in some cases, the absorptive-barrier layer 102 be applied to sapphire substrate 100 solely for its optical absorptive qualities. In this scenario, the absorptive-barrier layer 102 may be disposed on sapphire substrate 100 to facilitate absorption of optical (e.g., laser) energy and facilitate a laser cut in the sapphire substrate 100. However, the absorptive-barrier layer 102 may not necessarily provide substantial shielding from molten sapphire.

In one non-limiting example, the absorptive-barrier layer 102 may be formed from an ink that is painted or sprayed onto first surface 104. The ink forming absorptive-barrier 102 may form a thin, opaque material layer on first surface 104 of sapphire substrate 100, that may facilitate absorption of the laser beam to initiate the laser cut in the sapphire substrate 100, as discussed herein. The ink alone may not necessarily shield and/or prevent molten sapphire 118 from contacting or bonding to first surface 104 during the cutting process. However, the ink coating may be combined with another coating or layer to provide shielding or protection from molten sapphire. In some cases, the ink coating is used alone and there is not an additional protective layer applied to the surface of the substrate. In some cases, the enhanced optical properties of the surface due to the ink layer facilitates absorption of the laser beam, and helps to initiate and stabilize the laser cut within sapphire substrate 100. In some cases, the amount or spread of the molten sapphire 118 may be reduced and/or may be more easily removed from cut 106 by gas delivery nozzle 112 with a reduced amount of scattering or spatter.

The absorptive-barrier layer may be configured in a variety of example embodiments, as discussed herein. More specifically, a plurality of absorptive-barrier layers may be disposed or positioned on the sapphire substrate prior to performing a cut, as discussed herein. The inclusion of multiple absorptive-barrier layers on sapphire substrate may provide further support and/or may further aid in the shielding of the sapphire substrate from molten sapphire during the cutting process, as discussed herein. Additionally, the inclusion of multiple absorptive-barrier layers on sapphire substrate may aid in the formation of a localized region of heat energy at the first surface of the sapphire substrate and may help initiate a laser cut in the sapphire substrate. It is understood that similarly numbered components may function in a substantially similar fashion. Redundant explanation of these components has been omitted for clarity.

Figure 5A:
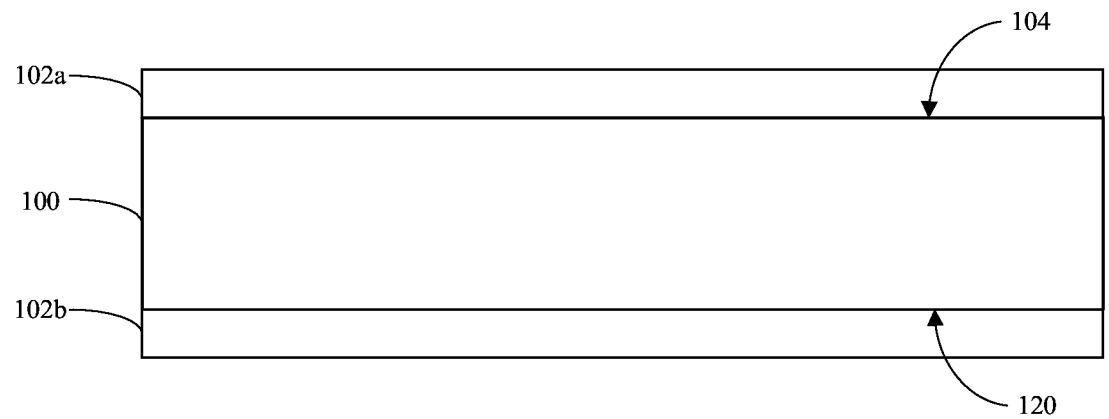
FIGS. 5A-C depict cross-sectional view of other example embodiments of a sapphire substrate having one or more absorptive-barrier layers.

FIG. 5A depicts a cross-sectional view of sapphire substrate 500 according to additional embodiments. As similarly discussed herein with respect to FIGS. 2 and 4A-F, sapphire substrate 500 may include absorptive-barrier layer 502a disposed and/or positioned on first surface 504 for forming a barrier for sapphire substrate 500. Distinct from sapphire substrate in FIGS. 2 and 4A-F, sapphire substrate 500 in FIG. 5A includes a distinct or second absorptive-barrier layer 502b formed on a second surface 520 of sapphire substrate 500. More specifically, sapphire substrate 500 may include a distinct absorptive-barrier layer 502b disposed on second surface 520 positioned opposite first surface 504 of sapphire substrate 500. As shown in FIG. 5A, absorptive-barrier layers 502a, 502b disposed on opposite surfaces of sapphire substrate 500 may be formed from the same material. In a non-limiting example, absorptive-barrier layers 502a, 502b may be formed from an opaque, polymer material, as similarly discussed herein with respect to FIGS. 2 and 4A-F. However, and as discussed herein, it is understood that absorptive-barrier layers 502a, 502b may be formed from distinct materials having similar characteristics or properties (e.g., opaque material, melting temperature lower than sapphire melting temperature, rough or abrasive surface, etc.). Absorptive-barrier layers 502b may be disposed on second surface 520 of sapphire substrate 500 using any suitable disposing technique discussed herein, where the disposing technique may be dependent, at least in part, on the material used in absorptive-barrier layer 502b.

Figure 5B:
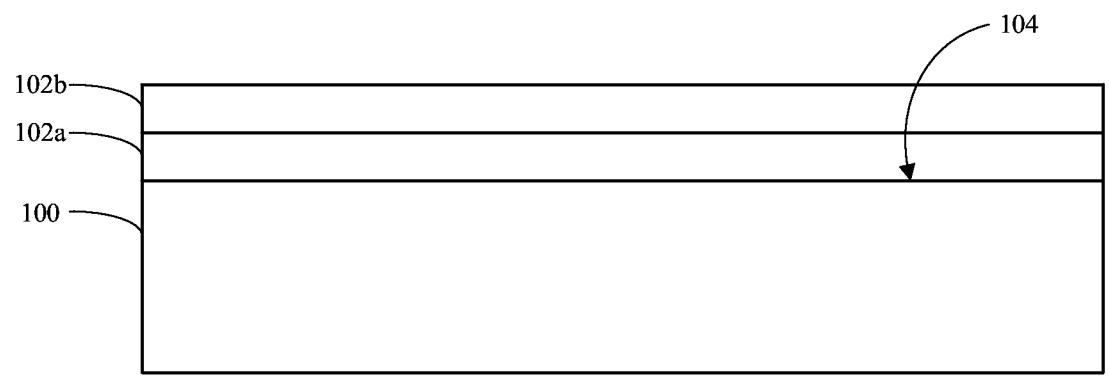

Similar to FIG. 5A, FIG. 5B depicts a cross-sectional view of sapphire substrate 500 including absorptive-barrier layers 203a, 503b. However, distinct from FIG. 5A, FIG. 5B shows absorptive-barrier layer 503b disposed or positioned on absorptive-barrier layer 503a. More specifically, absorptive-barrier layer 503a may be disposed on first surface 504 of sapphire substrate 500, as discussed herein, and absorptive-barrier layer 503b may be disposed directly on absorptive-barrier layer 503a, and may be positioned adjacent first surface 504 of sapphire substrate 500. As shown in FIG. 5B, absorptive-barrier layers 503a, 503b may be formed from different materials. That is, in another non-limiting example, absorptive-barrier layers 503a disposed on first surface 504 of sapphire substrate 500 may be formed from a polyester sheet and absorptive-barrier layers 503b disposed on absorptive-barrier layer 503a may be formed from a plastic film. In another example, a first layer 503a may provide substantial protection or shielding from any molten sapphire that may be produced during a laser cut. The second layer 503b may provide substantial optical absorption to facilitate absorption of the laser and help initiate a laser cut. Thus, the two layers 503a, 503b may together provide a barrier layer having the desired optical properties to facilitate a laser-based cutting operation. Absorptive-barrier layers 503b may be disposed on absorptive-barrier layer 503a using any suitable disposing technique discussed herein, where the disposing technique may be dependent, at least in part, on the material used in absorptive-barrier layer 503b.

Figure 5C:
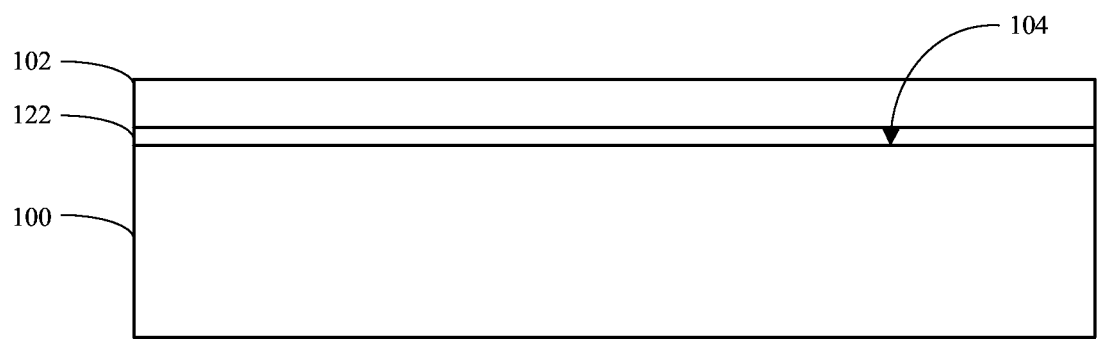

FIG. 5C shows a cross-sectional view of sapphire substrate 500 according to another embodiment. As shown in FIG. 5C, absorptive-barrier layer 524 may be disposed or positioned on first surface 504 of sapphire substrate using an adhesive 522. More specifically, absorptive-barrier layer 524 may be adhered to sapphire substrate 500 via adhesive 522 applied to first surface 504. Adhesive 522 may be used to adhere absorptive-barrier layer 524 to sapphire substrate 500 where absorptive-barrier layer 524 is made from a material that may not naturally adhere to the first surface 504. In a non-limiting example where absorptive-barrier layer 524 includes a pre-manufactured plastic film, adhesive 522 can be applied directly to first surface 504 of sapphire substrate 500, and absorptive-barrier layer 524 (e.g., plastic film) may be adhered or bonded to adhesive 522. Once bonded to adhesive 522, absorptive-barrier layer 524 may be disposed or positioned on first surface 504 prior to performing a cutting process on sapphire substrate 500, as discussed herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A method for forming a sapphire component, the method comprising:
   selectively applying an absorptive-barrier layer that is confined to a first area of a surface of an optically transparent sapphire substrate;
   initiating a fusion cut at the first area by:
      irradiating the absorptive-barrier layer with a laser beam;
      absorbing, by the absorptive-barrier layer, heat energy from the laser beam; and
      forming a region of molten sapphire at the first area using the heat energy absorbed by the absorptive-barrier layer;

continuing the fusion cut by advancing the laser beam through the first area to a second area of the surface outside the first area of the optically transparent sapphire substrate;

removing molten sapphire from the fusion cut while continuing the fusion cut; and removing the absorptive-barrier layer from the first area.

2. The method of claim 1, wherein selectively applying the absorptive-barrier layer includes one or more of:

selectively spraying the absorptive-barrier layer on the first area;

selectively printing the absorptive-barrier layer on the first area;

selectively painting the absorptive-barrier layer on the first area;

selectively dispensing the absorptive-barrier layer on the first area; and selectively adhering the absorptive-barrier layer on the first area.

3. The method of claim 1, wherein:

removing molten sapphire from the fusion cut comprises removing molten sapphire using a stream of gas.

4. The method of claim 1, wherein the absorptive-barrier layer is configured to increase an absorption of the laser beam's radiation within the optically transparent sapphire substrate to create a localized region of heat energy at the first area.

5. The method of claim 4, wherein initiating the fusion cut in the first area comprises using the localized region of heat energy to form the molten sapphire.

6. The method of claim 1, wherein the absorptive-barrier layer is formed from a material having a melting temperature that is lower than a melting temperature of the optically transparent sapphire sheet and equal to or greater than 200° C.

7. The method of claim 1, wherein the absorptive-barrier layer is formed from a film of opaque polymer material.

8. The method of claim 1, wherein the absorptive-barrier layer is formed by selectively coating the first area using a physical vapor deposition (PVD) process.

9. The method of claim 1, wherein the absorptive-barrier layer is formed by selectively depositing an ink on the first area.

10. The method of claim 1, wherein the absorptive-barrier layer includes an opaque material having a diffuse surface finish.

11. The method of claim 1, wherein a thickness of the optically transparent sapphire substrate is equal to or less than 0.5 millimeters.

12. The method of claim 1, wherein a thickness of the optically transparent sapphire substrate is between 0.1 millimeters and 3 millimeters.

13. A method of cutting a sapphire component, the method comprising:

selectively applying an absorptive-barrier layer to a first area of a surface of an optically transparent a sapphire substrate, the absorptive-barrier layer being confined to the first area;

initiating a fusion cut through the optically transparent sapphire substrate at the first area by:

irradiating the absorptive-barrier layers using a laser beam incident on the absorptive-barrier layer; and transferring heat energy from the laser beam absorbed the first absorptive-barrier layer to the first area to form molten sapphire at the first area;

continuing the fusion cut by advancing the laser beam through the first area to a second area of the surface outside the first area of the optically transparent sapphire substrate; and cutting through the optically transparent sapphire substrate at the second area using the laser.

14. The method of claim 13, wherein cutting through the optically transparent sapphire substrate includes a laser fusion cutting process that comprises:

irradiating the second area with the laser to form a portion of molten sapphire; and removing the molten sapphire from the optically transparent sapphire substrate using a stream of gas.

15. The method of claim 14, further comprising:

shielding the second area from the molten sapphire using a second absorptive-barrier layer applied to the second area.

* * * * *